D. D. HENDERSON.
VALVE CLEANER.
APPLICATION FILED FEB. 28, 1921.
1,399,962.
Patented Dec. 13, 1921.
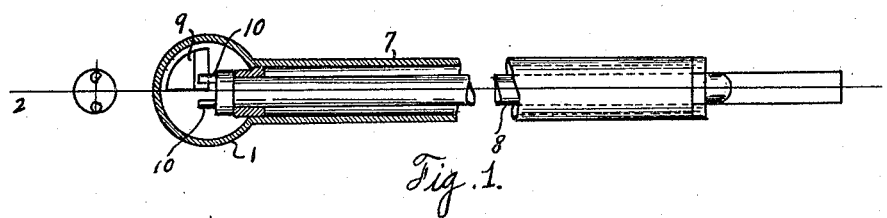
Fig. 1.
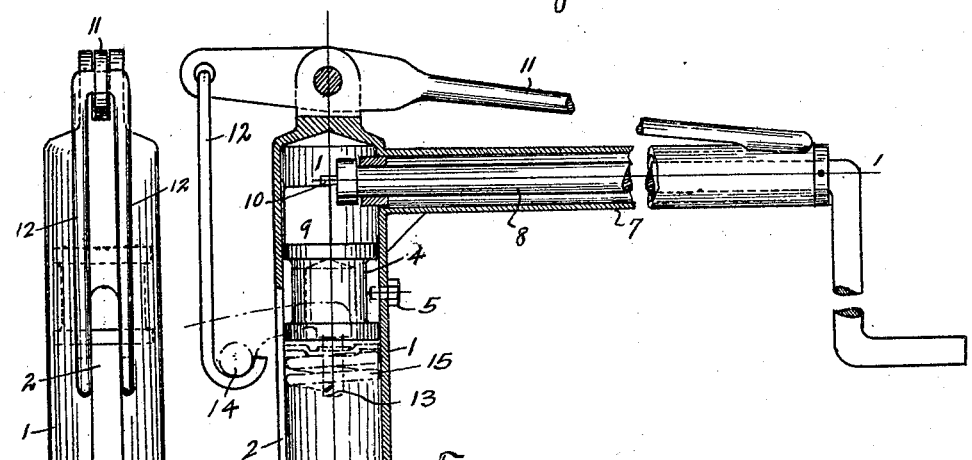
Fig. 3.
Fig. 2.
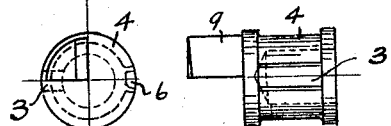
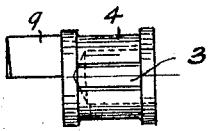
Fig. 4.
Fig. 5.
Inventor
Daniel D Henderson
By
Hardway & Cathey
Attorneys.

UNITED STATES PATENT OFFICE.

DANIEL D. HENDERSON, OF HOUSTON, TEXAS, ASSIGNOR OF ONE-HALF TO WILLIAM R. DREXEL, OF HOUSTON, TEXAS.

VALVE-CLEANER.

1,399,962.   Specification of Letters Patent.   Patented Dec. 13, 1921.

Application filed February 28, 1921. Serial No. 448,719.

*To all whom it may concern:*

Be it known that I, DANIEL D. HENDERSON, a citizen of the United States, residing at Houston, in the county of Harris and State of Texas, have invented certain new and useful Improvements in Valve-Cleaners, of which the following is a specification.

This invention relates to new and useful improvements in a valve cleaner.

One object of the invention is to provide a device of the character described which is specially adapted for use in cleaning, and removing carbon from, the valve of internal combustion motors, particularly motors used in automobiles.

Another object of the invention is to provide a device of the character described which may be used without removing the valve or in any way disassembling the motor.

A further feature of the invention resides in the provision of a device of the character described which is simple in construction and consequently cheap in manufacture and which is convenient in application and use.

With the above and other objects in view the invention has particular relation to certain novel features of construction, operation and arrangement of parts, an example of which is given in this specification and illustrated in the acompanying drawings wherein:—

Figure 1 is a horizontal sectional view taken on the line 1—1 of Fig. 2.

Fig. 2 is a vertical sectional view taken on the line 2—2 of Fig. 4.

Fig. 3 is an end view, and

Fig. 4 is a plan view of a plunger employed, and

Fig. 5 is a side view thereof.

Referring now more particularly to the drawings, wherein like numerals of reference designate similar parts in each of the figures, the numeral 1 indicates a tubular casing having a lengthwise slot 2 cut through one side thereof, which is in alinement with a corresponding slot 3 cut through one side of the hollow plunger 4. This plunger is adapted to reciprocate in the casing and is held against rotation by means of the set screw 5 which is screwed through the casing and whose inner end projects into a groove 6 in the plunger. The casing has a laterally extending tubular handle 7, within which there are bearings in which the crank 8 works. The upper end of the plunger has a projection 9 which extends upwardly therefrom and the inner end of the crank has the spaced pins 10, 10 projecting out therefrom, as shown. Pivoted to the upper end of the casing there is a grip handle 11, one end of which has the depending hooks 12.

In operation, the device is set over the valve stem 13 of any ordinary type of puppet valve motor, said stem projecting up into the plunger 4 and the hooks 12 are engaged over the rocker arm bearing 14 or any other suitable available anchor, said rocker arm working through the slots 2 and 3. The grip handle 11 is then grasped and held firmly against the handle 7 and this will anchor the device firmly in place. The crank 8 is then turned and the pins will alternately engage against the projection 9 and force the plunger 4 downwardly, compressing the valve spring 15. When the pin passes said projection 9 the spring 15 will suddenly close the valve. The crank is rotated very rapidly, the pins operating as described to open the valve and then suddenly release the same for a quick closing. The valve is thus successively opened and suddenly released to permit its quick closing. Carbon and other deposits will thereby be jarred loose and worn away and thus removed from the valve and seat so as to permit the valve thereafter to seat perfectly.

What I claim is:—

1. In combination, a tubular casing, a plunger adapted to reciprocate therein, a crank rotatably mounted in suitable bearings and means carried by the crank and arranged to contact with said plunger successively as the crank is rotated.

2. In combination, a casing adapted to fit over a valve stem, a plunger therein and a rotatable member adapted to successively engage against and release said plunger, whereby the plunger is driven by successive strokes against the valve stem to open the valve.

3. In combination, a casing adapted to fit over a valve stem, means for anchoring said casing securely in place and a mechanism adapted to operate against the valve stem to open and then suddenly release the valve to permit its quick closing.

4. In combination, a casing adapted to fit over a valve stem, means for anchoring the casing securely in place, a plunger adapted to reciprocate within the casing, said casing and plunger having alined slots to receive the rocker arm which actuates the valve, a projection carried by said plunger and a rotatable member provided with actuating means which successively contact with and release said projection as said member is rotated, whereby the valve is opened and released in quick succession.

5. In combination, a casing, a plunger adapted to reciprocate therein, means for preventing the rotation of the plunger relative to the casing, and a manually rotatable member formed to contact successively against one end of the plunger as said member is rotated.

6. In combination, a casing, a plunger therein, a lateral tubular handle attached to the casing, a crank working through the handle and whose inner end is formed with a plurality of projections which successively contact with the plunger as the crank is rotated.

7. In combination, a casing, a plunger therein, a lateral tubular handle attached to the casing, a crank working through the handle and whose inner end is formed with a plurality of projections which successively contact with the plunger as the crank is rotated, and means for anchoring the device securely in position during the operation thereof.

In testimony whereof I have signed my name to this specification in the presence of two subscribing witnesses.

DANIEL D. HENDERSON.

Witnesses:
   JNO. B. OLIVER,
   WM. A. CATHEY.